June 5, 1934.   W. F. HALL   1,961,856
QUICK TRANSFER FOR SIDE ARM CONVEYING MECHANISM
Filed Aug. 24, 1932   8 Sheets-Sheet 1
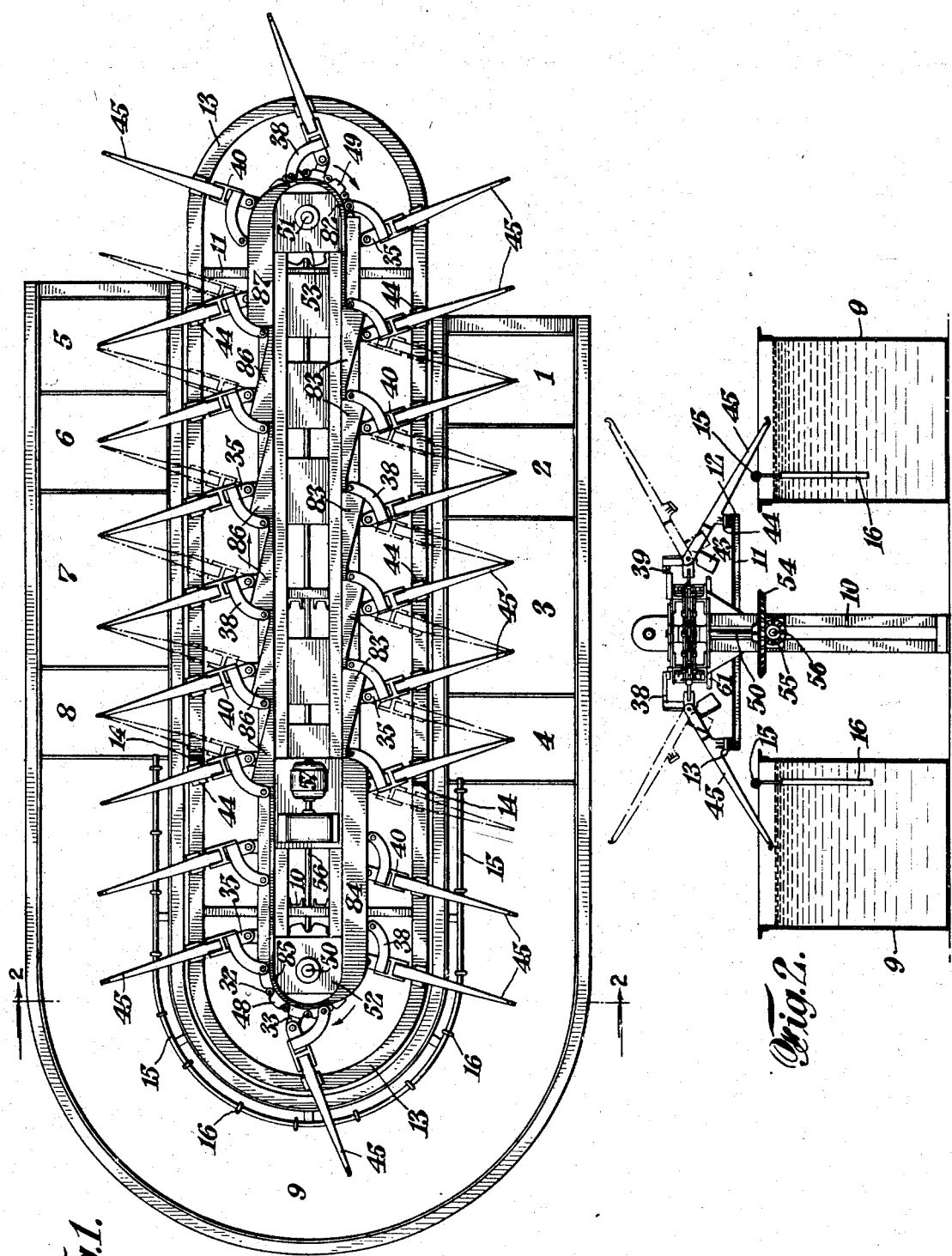
INVENTOR
*WESLEY F. HALL*
BY
ATTORNEYS

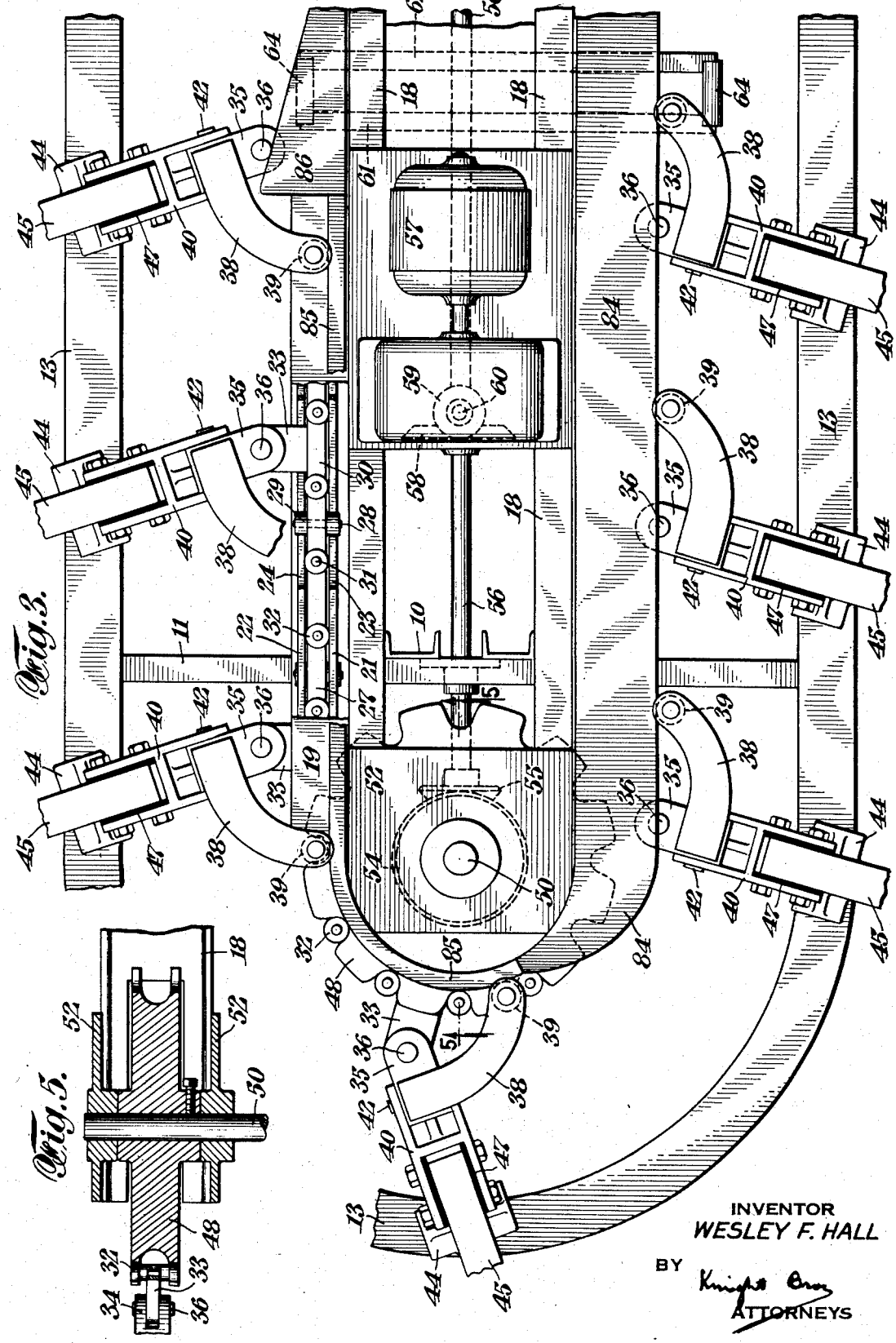

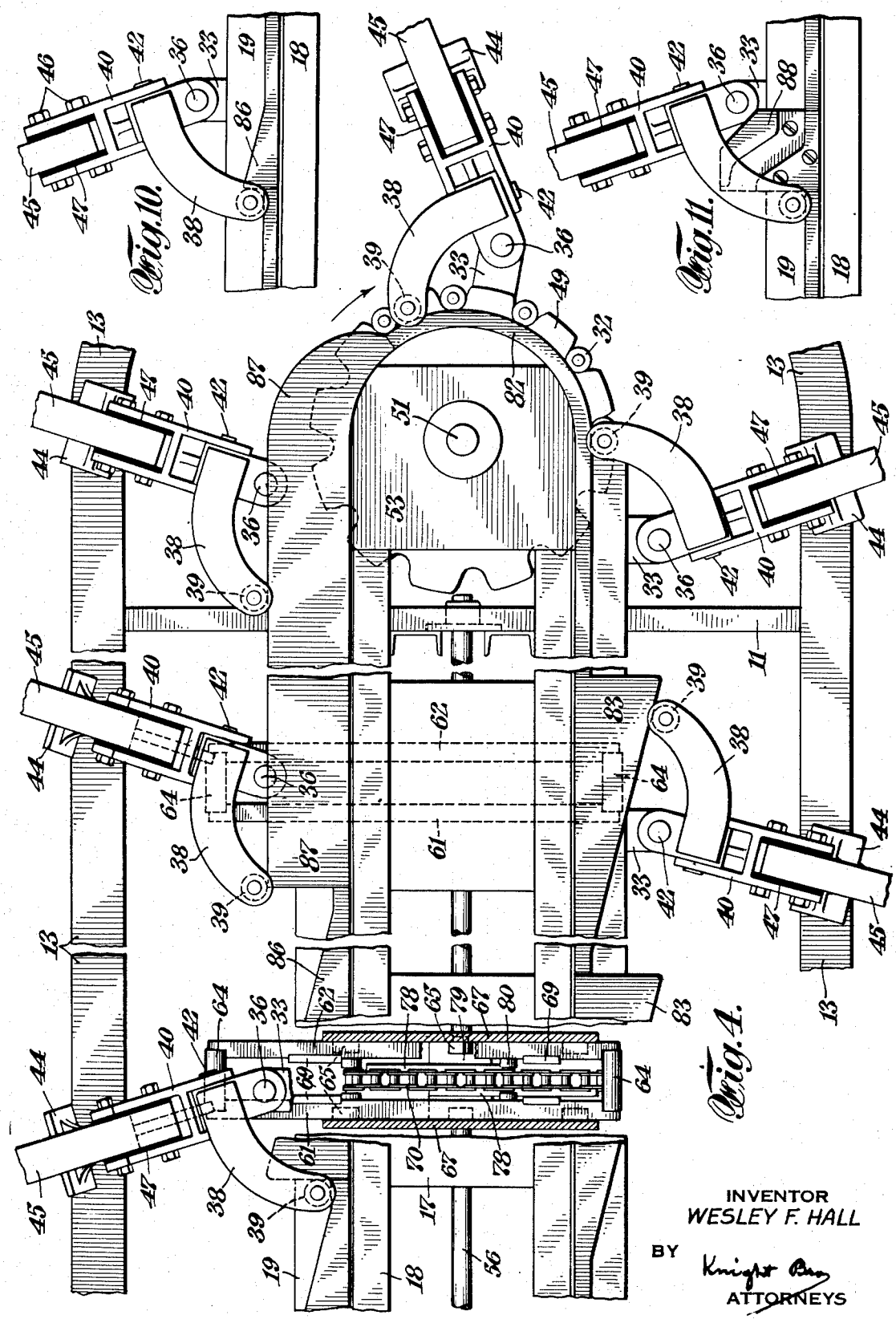

June 5, 1934.   W. F. HALL   1,961,856
QUICK TRANSFER FOR SIDE ARM CONVEYING MECHANISM
Filed Aug. 24, 1932   8 Sheets-Sheet 4
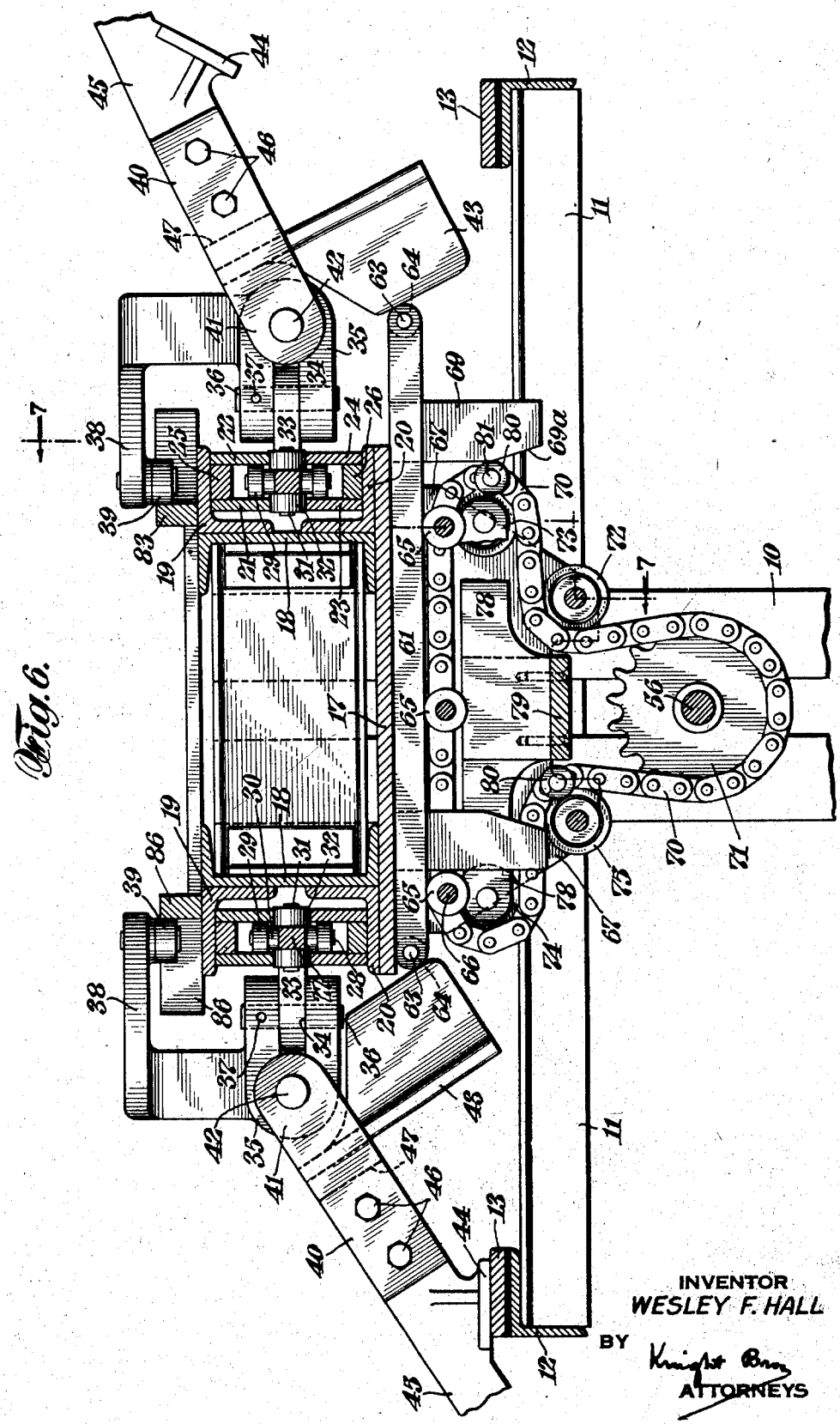
INVENTOR
WESLEY F. HALL
BY Knight Bros
ATTORNEYS

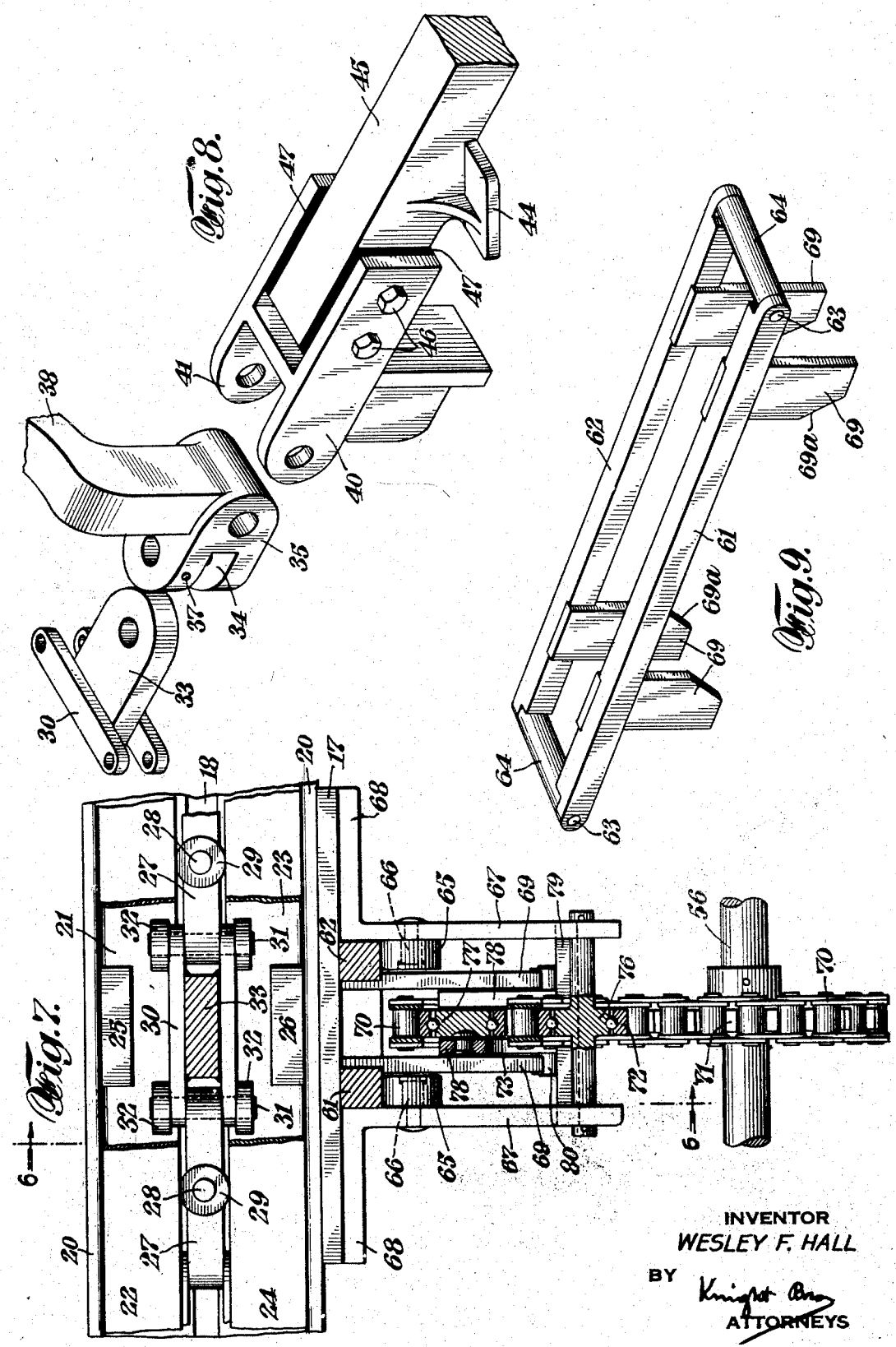

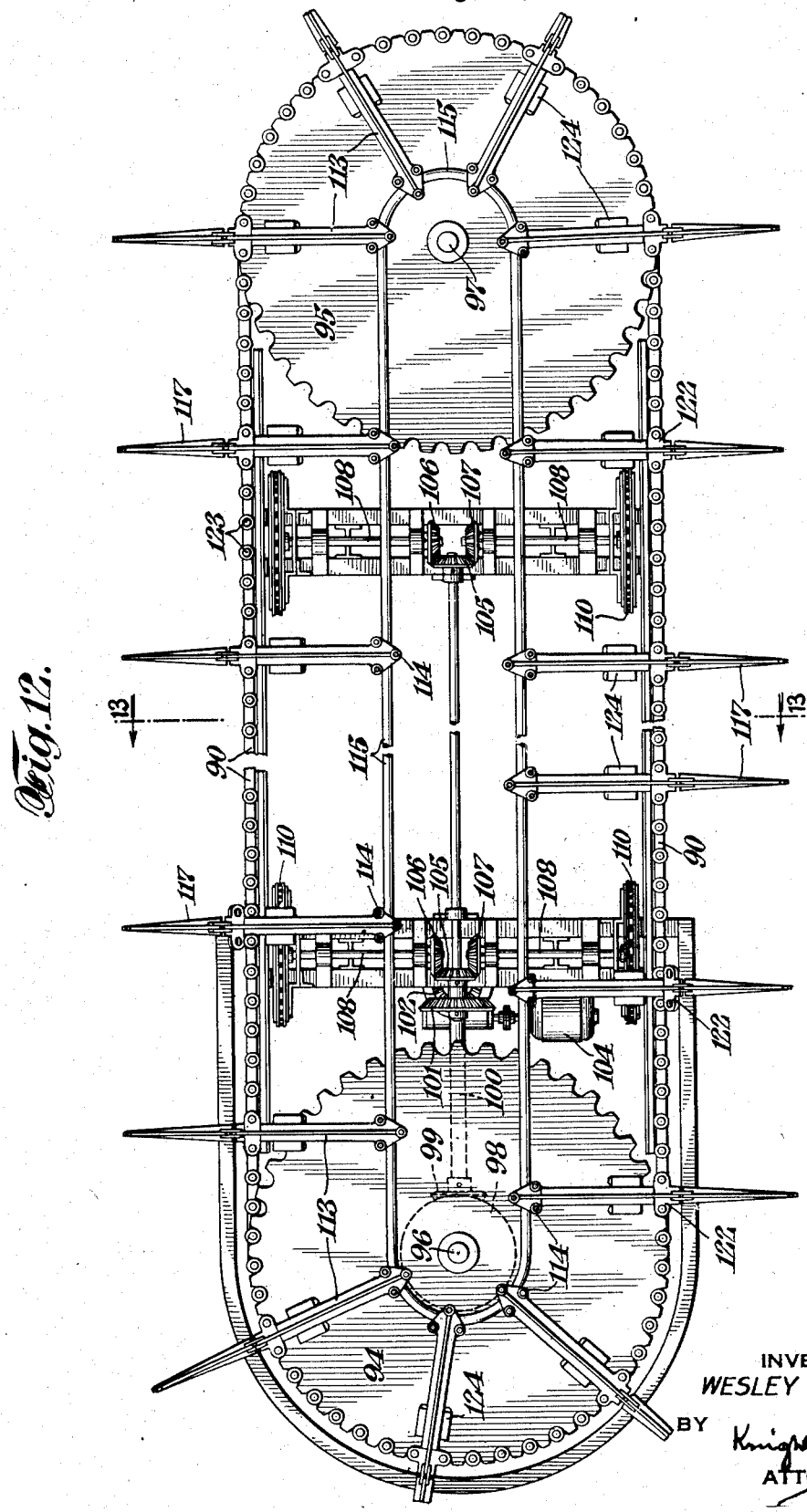

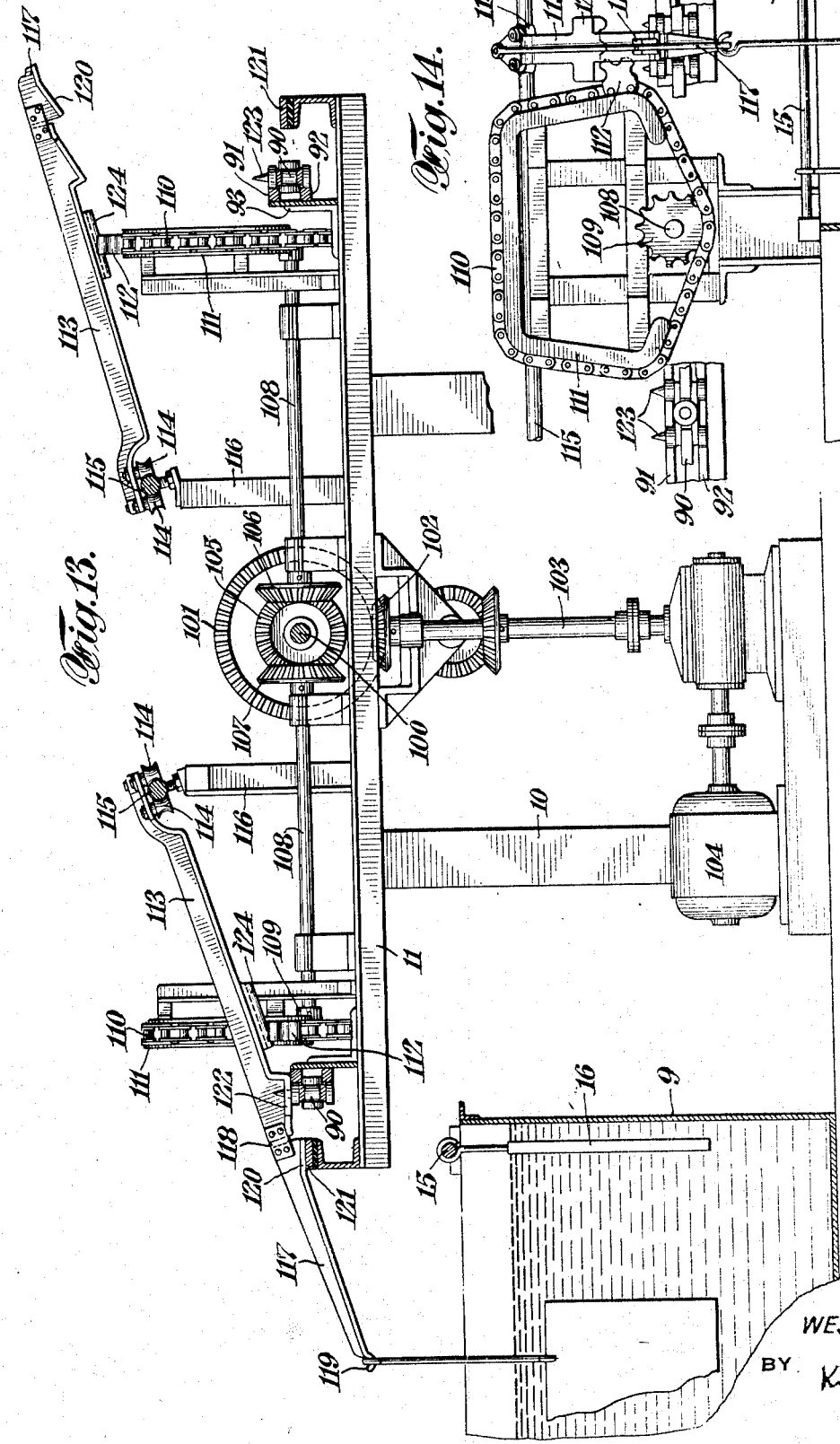

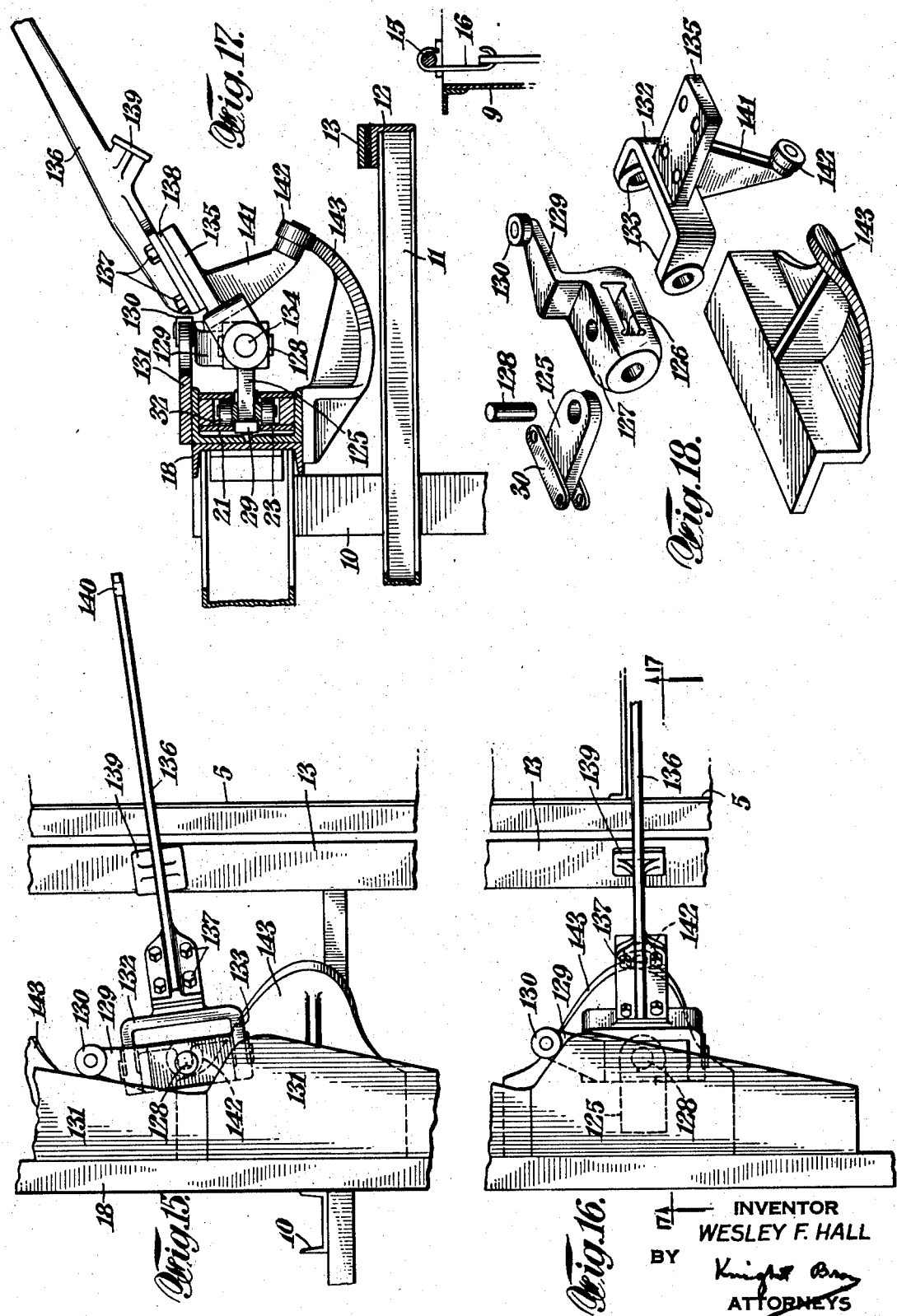

Patented June 5, 1934

UNITED STATES PATENT OFFICE 1,961,856

QUICK TRANSFER FOR SIDE ARM CONVEYING MECHANISM

Wesley F. Hall, Matawan, N. J., assignor to Hanson-Van Winkle-Munning Company, Matawan, N. J., a corporation of New Jersey Application August 24, 1932, Serial No. 630,209

21 Claims. (Cl. 214—17)

The present invention relates to improvements in transfer conveyors for automatic machines for chemical and electrochemical operations of the type in which the treated articles are suspended upon carriers in the form of arms projecting laterally from the conveyor, said carrier arms being normally movable with the conveyor, but also capable of movements relative thereto under the control of means for raising and lowering the carrier arms in the transfer of work articles from one tank to another.

These side arm conveying machines, as heretofore constructed for chemical and electrochemical operations, have been subject to the great disadvantage of too long an exposure of the work articles to the air while being transferred from one treatment tank to the next at the same slow rate of advance of the main conveyor.

The main object of the present invention is to correct this defect in side arm conveying mechanisms by providing means to accelerate the advance of the side arm carriers while articles are being transferred from one treatment tank to another.

To this end the present invention comprises a main automatic conveyor preferably in the form of an endless conveyor chain supported above and alongside of a succession of treatment tanks, a series of carrier arms mounted for normal advancing movement by and with the conveyor chain and also for additional movements of the carrier arms relatively to the chain both in the horizontal plane of the conveyor and in vertical planes transversely of the path of the conveyor, and suitable means acting upon said carrier arms for raising and lowering them to transfer articles from one treatment tank to the next and for moving them forwardly relatively to and at greater speed than the conveyor to effect the acceleration of the advancing movement of the articles under treatment during the time they are being transferred from tank to tank. The carrier arms of the side arm type of conveyor may be mounted in various ways, such as by means of vertical and horizontal pivots (universal joints) connecting them directly with the conveyor chain by which they are transported, and controlled and actuated for the described relative movements by either movable or fixed devices cooperating with the conveyor chain;—or said carrier arms may be mounted to move upon a fixed track bar and be normally transported by the main conveyor and periodically actuated by an auxiliary transfer chain which moves the carrier arms into and out of driving connections with the main conveyor, and raises and lowers the arms to transfer the supported articles from tank to tank, and accelerates the advancing movements of the arms during the said transfers.

The machine of the present application is believed to be the first to practically embody in a side arm conveying mechanism means for accelerating the advance of articles under treatment while they are being transferred from one treatment tank to another, and it is therefore intended to cover in the present application this novel principle in its broadest aspects without regard to the specific form of mounting of the side arm carriers or the mechanism for effecting and controlling their movements with relation to the conveyor chain.

In order that the invention may be fully understood it will first be described with reference to the several practical embodiments illustrated in the accompanying drawings and the patentable novelty afterwards more particularly pointed out in the annexed claims.

In said drawings—

Figure 1 is a plan view of an electroplating machine illustrating the present invention.

Figure 2 is a vertical transverse sectional view of the same taken on the line 2—2 of Figure 1.

Figure 3 is an enlarged plan view of part of the machine shown in Figure 1.

Figure 4 is a similar view of another part of the machine shown in Figure 1.

Figures 3 and 4 taken together illustrate in plan view the complete machine of Figure 1.

Figure 5 is a vertical detail longitudinal sectional view taken on the line 5—5 of Figure 3.

Figure 6 is a vertical transverse sectional view taken on the line 6—6 of Figure 7.

Figure 7 is a vertical longitudinal sectional view taken on the line 7—7 of Figure 6.

Figure 8 is an exploded perspective view illustrating the mounting of the carrier arms upon the conveyor chain.

Figure 9 is a detail perspective view of the sliding arm lifting member of one form of carrier lifting device.

Figure 10 is a detail plan view illustrating one form of carrier accelerating means.

Figure 11 is a similar view of a modified form of said device showing the use of a different form of controlling cam.

Figure 12 is a view similar to Figure 1 of a modified form of machine embodying the present invention.

Figure 13 is an enlarged vertical transverse sectional view of the same taken on the line 13—13 of Figure 12.

Figure 14 is a detail vertical longitudinal sectional view illustrating the form of carrier lifting device forming part of the machine shown in Figures 12 and 13.

Figures 15 and 16 are detail plan views of a further modified form of mechanism for simultaneously raising and accelerating the advance of the carrier arm upon the conveyor.

Figure 17 is a detail transverse sectional view taken on the line 17—17 of Figure 16, and Figure 18 is an exploded perspective view of the carrier arm mounting and controlling mechanisms of the form shown in Figures 15, 16 and 17.

The invention will first be described in the form illustrated in Figures 1 to 10 inclusive of the drawings. This form of the invention comprises an electroplating machine in which a series of tanks 1, 2, 3, 4 and 5, 6, 7, 8 are arranged in parallel relation upon opposite sides of the machine proper and abut the ends of a long U-shaped tank 9 which extends from side to side adjacent tanks 4 and 8 around the end of the machine. These tanks are provided with the proper liquids and solutions depending upon the particular electroplating process that is to be carried out, the anodes being arranged in the proper tanks and the cathode contact rails being mounted for cooperation with the article carriers as presently indicated.

The series of treatment tanks just referred to are arranged with respect to a central upright frame having standards 10 supporting angle iron cross bars 11 upon the outer ends of which are mounted the angle iron bars 12 carrying the carrier supporting cathode contact rail 13 which is suitably insulated upon the bars 12 in the usual manner. This cathode contact rail 13, as shown in Figure 1 of the drawings, extends along both sides and around both ends of the machine. In the particular embodiment shown, the rail is provided with insulated sections at 14 to confine the current to the side and end sections extending the length of the U-shaped tank 9, said tank carrying an anode contact bar 15 from which depend the anodes 16 supported thereon at suitable intervals. In the illustration in Figure 1, the portion of carrier supporting rail 13 for tanks 1 to 4 and 5 to 8 is not supplied with current and the anode bar is omitted from said tanks. The particular process to be carried on in the arrangement as shown is immaterial to the present invention.

Mounted in the upper end of standards 10 is a rigid frame made up of plates and bars to constitute a track around which operates the automatic conveyor. This top track frame comprises a base plate 17 rigidly secured to the standards 10 and supporting the main longitudinal channel bars 18 suitably braced to ensure rigidity. The flanges of the channel bars 18 are presented inwardly and secured to their vertical outer faces are the upper and lower angle bars 19 and 20, the lower bars 20 being supported upon the base plate 17. Arranged between the horizontal flanges of angle bars 19 and 20 are the parallel track rails 21, 22 and 23, 24, the first two of which, 21, 22, are secured with a spacing plate 25 between them to the under surface of horizontal flange of angle bar 19, while the others 23, 24, are secured with a spacing plate 26 between them to the upper surface of the horizontal flange of angle bar 20. The track rails 21, 22 are spaced vertically from the track rails 23, 24 with the result that track surfaces are provided upon the vertical inner surfaces of all the track rails as well as upon the adjacent horizontal edges of the vertically separated rails. This formation of track is for the purpose of accurately supporting the main conveyor chain which, as will presently appear, is formed with bearing rollers upon both vertical and horizontal journals.

The structure of the endless conveyor chains operating upon and between the track rails 21, 22, 23, 24 is best shown in Figures 6 and 7 of the drawings, said chain being made up of solid bar links 27 of square cross-section carrying central laterally projecting journal studs 28 upon which are journalled the anti-friction bearing rollers 29 designed to operate in the horizontal guideways between the upper track rails 21, 22 and the lower track rails 23, 24.

The solid link members 27 alternate with link members 30 having bifurcated ends straddling the ends of links 27 and pivotally connected thereto by vertical pins 31 upon the projecting ends of which are journalled the anti-friction rollers 32, the upper ones of which operate between the track rails 21, 22 while the lower ones operate between the lower track rails 23, 24.

The bifurcated chain links 30 are provided at intervals with outwardly presented perforated studs 33 presented in the horizontal slots 34 of the carrier blocks 35 and pivotally connected thereto by vertical pivot pins 36 secured against accidental displacement by transverse anchor pins 37. Each carrier block 35 is formed with an upwardly projecting arm 38 curving inwardly and rearwardly and carrying an anti-friction roller 39 which operates in engagement with a controlling rail and a series of accelerating cams presently to be described.

A boxing 40 is formed with the rearwardly presented ears 41 which straddle and are pivotally connected with each carrier block 35 by means of a horizontal pin 42. Formed integral with and projecting downwardly from the boxing 40 is a flanged plate 43 designed to be engaged by a reciprocating carrier elevating member hereinafter described.

45 is a carrier arm formed with an angularly presented contact shoe 44 designed to rest and slide upon the cathode contact rail 13 above referred to. The carrier arm 45 is secured in the boxing 40 by means of transverse bolts 46, the arm being suitably insulated from the boxing 40 by plates of insulation indicated at 47.

The endless conveyor chains of links 27 and 30 operate around the horizontal sprockets 48 and 49 mounted respectively upon the vertical shafts 50 and 51 journalled in suitable bearings supported upon base plate 17 and the top plates 52, 53. The sprocket 48 is the driving sprocket while the sprocket 49 is the idler sprocket, the vertical shaft 50 carrying at its lower end a bevel gear 54 meshing with a bevel pinion 55 on the end of a longitudinal shaft 56 suitably journalled in the machine frame and carrying a bevel gear 58 meshing with a bevel pinion 59 upon an upright shaft 60 driven by motor 57 through suitable gearing not specifically shown.

Mounted in vertical transverse planes of the machine embracing the dividing walls between adjacent treatment tanks are suitable reciprocating carrier elevating devices which, in the form of the machine under consideration, shown best in Figures 6, 7 and 9 of the drawings, comprises the side bars 61 and 62 connected at their ends by rods 63 upon which are freely journalled the rollers 64. Each of these elevating frames is mounted beneath frame plate 17 upon anti-friction rollers 65 journalled upon studs 66 mounted on and projecting inwardly from the depending plates 67 whose horizontal flanges 68 are secured to the under surface of the frame plate 17. The frame 61, 62 carries the four downwardly presented legs 69 which operate between the anti-friction rollers 65 upon which the frame 61, 62 rests. An endless chain 70 passes around driving sprocket 71 upon the shaft 56 and over guide rollers 72, 73, 74 and 75, two of which have ball bearing mountings such as indicated at 76 in Figure 7 supported by the depending plates 67, and the other two of which have ball bearing mountings as indicated at 77 supported in a track frame 78 mounted upon a bridge plate 79 secured to and projecting between the plates 67. This sprocket chain 70 is provided at proper intervals with anti-friction rollers 80 journalled upon oppositely projecting studs 81 upon said chain to present them at predetermined times in engagement with the bevelled lower inner faces 69a of the legs 69 which are presented in the paths of the rollers 80. The result of this arrangement will be obvious from the showing in Figure 6 of the drawings, the rollers 64 of the frame 61, 62 being presented in horizontal planes in position to engage the depending flanged plates 43 of the carrier arms. When the particular carrier arm reaches the position where it is desired to raise it upon its pivot 42 to transfer articles from one tank to another, the rollers 80 upon a sprocket chain 70 will engage legs 69 and force the frame 61, 62 outwardly to move an anti-friction roller 64 in engagement with plate 43 to lift the carrier arm. It will be noted that the carrier engaging rollers 64 are of sufficient length to retain their engagement with the carrier arm an appreciable time during which the carrier is advanced by the main conveyor and its advance movement accelerated by the accelerating means hereinafter described. The lifting frame 61, 62 supports the carrier arm in its elevated position for a sufficient time to permit the carrier to be advanced far enough to transfer the work articles to another tank when the carrier arm is lowered, said lowering operation being effected by the engagement of another pair of rollers 80 upon the chain 70, with the opposite legs 69 to shift the frame 61, 62 in the opposite direction and permit the lowering of the temporarily elevated carrier arm. The contact 44 breaks the circuit connection with cathode rail 13 when the arm is elevated and automatically makes the circuit therewith when the carrier arm is again lowered. It will, of course, be understood that the lifting frames 61, 62 are so positioned in the machine in conjunction with the arrangement of treatment tanks that the lifting movement upon the carrier arm upon one side of the machine will correspond in point of time with the lowering movement upon another carrier arm upon the opposite side of the machine. If preferred, however, there can be an individual lifting frame 61, 62 for each transfer station upon each side of the machine. It will readily be understood that the relative arrangement of treatment tanks and lifting frames can be provided to either cooperate upon opposite sides of the machine or act independently without interference.

As stated above, means are provided in the improved machine for accelerating the advance movement of the carrier arms during the lifting and lowering operation to minimize the time the work articles are exposed to the action of the air in the transferring operation. In the form of machine under consideration this acceleration of the advance of the carrier arms is accomplished by means of a series of stationary cams mounted on top of the machine frame in position to act upon the anti-friction rollers 39 of the angular arms 38 projecting rearwardly from the carrier arm blocks 35. Starting with the right hand end of the machine as shown in Figures 1 and 4, it will be observed that the controlling arms 38 of the carriers follow the upwardly presented guide rail 82 which is concentric with the idler sprocket 49 around which the main conveyor chain 27, 30 passes. This engagement of arms 38 maintains the carrier arms inclined slightly to the rear from the chain links to which they are attached as clearly shown in Figure 1 of the drawings. The carrier arms, having the work articles hung upon their outer hook ends, maintain this position with relation to the conveyor chain until they reach the point where they have to be raised and lowered for suspension of the work articles in the first treatment tank 1. When a carrier reaches this position relative to the tank 1, the roller upon the controlling arm 38 engages the abrupt surface of a face cam 83 which forces the arm 38 outwardly to accelerate the advance of the work articles supported on the outer hook ends of the arm. The accelerating cam 83 is positioned to act upon the carrier arm at the moment the carrier elevating mechanism comes into action so that simultaneously with the elevation of the carrier it is advanced with a greater speed than the normal movement of the conveyor and thereby materially lessens the time for the transfer of the work articles. As the carrier arm is lowered with the work articles dipping into the solution of the first tank, the arm will be inclined forwardly of the conveyor link upon which it is supported, and as the conveyor advances the carrier arm with the articles in tank 1, the roller upon controlling arm 38 will gradually move downwardly on the long inclined face of cam 83 and permit the carrier arm to gradually return to its rearwardly inclined position upon the conveyor chain. In Figure 1 of the drawings, the rearwardly inclined position of the carrier arms upon the chain is indicated in full lines while the forwardly inclined position, at the completion of each accelerating movement, is indicated in dotted lines.

In the same manner the carrier is actuated for transferring from tank 1 to tank 2 and from tank 2 to 3, 3 to 4 and 4 to 9. In passing through tanks 1, 2, 3, 4 and 9 there is a succession of accelerating cams 83 which cooperate with an equal number of carrier elevating devices above described.

When a carrier arm transfers from tank 4 to tank 9 it will be observed that there is an extended high cam surface indicated at 84 which maintains the carrier arm in its forwardly inclined position for a part of the travel of the articles through the elongated tank 9, said cam 84 gradually lowering at the left hand end of the machine into the controlling guide rail 85 which, for the latter part of travel of the articles through tank 9 maintains the carrier arms in rearwardly inclined relation to the conveyor chain.

In transferring work articles from tank 9 to tank 8 and so on down to the final tank 5, carrier arms are subjected to the action of a series of cams 86 of the same formation as the cams 83 upon the opposite side of the machine, the carrier lifting devices acting in conjunction with said accelerating cams 86 in the transfer of articles from tank to tank.

When the carrier reaches the end of the final treatment tank 5 its movement out of the tank is accelerated and the controlling arm 38 is maintained in engagement with a controlling cam 87 which holds the arm in a forwardly inclined position upon the conveyor chain until cam 87 merges into the controlling guide rail 82 above referred to.

In Figure 11 of the drawings a modified form of accelerating cam is shown, the cam 88 of this modification being a channel cam for more positively controlling the movements of the carrier arm inwardly and outwardly upon the supporting conveyor chain. Figures 12, 13 and 14 of the drawings show a modified form of mechanism embodying the invention of this application. In this form of machine a main conveyor chain indicated at 90 operates upon the double track rails 91, 92 supported upon the angle bars 93 of the frame. Said chain 90 is equipped with anti-friction rollers upon both vertical and horizontal studs, similar to the chain above described in connection with the first form of the machine. At the ends of the machine the sprocket chain operates around two large sprocket wheels 94, 95 mounted upon vertical shafts 96, 97 suitably journalled in the machine frame. The sprocket wheel 94 is the driving sprocket, its supporting shaft 95 carrying a bevel gear 98 driven by a bevel pinion 99 on a shaft 100 which carries at its inner end a bevel gear 101 driven by a similar gear 102 upon a vertical shaft 103 suitably driven by an electric motor 104. Shaft 100 also carries the bevel gears 105 meshing respectively with gears 106 and 107 upon the inner ends of oppositely extending lateral shafts 108, each one of which carries at its outer end a driving sprocket 109 actuating a transfer chain 110 which operates over a rigid track 111.

This transfer chain 110 carries a block rack 112 for engaging and raising carrier arms of the construction presently to be described.

The carrier arms, in the form of machine shown in Figures 12, 13 and 14 now under consideration, comprises the main arm section 113 carrying at its inner end cooperating grooved anti-friction rollers 114 journalled on downwardly presented studs and embracing a guide rail 115 of circular cross-section mounted upon the upper ends of supporting brackets 116. The work supporting end 117 of the carrier arms is insulated at 118 from the main section 113 and is provided at its outer end with a supporting hook 119 for work articles and a contact shoe 120 which is adapted to ride in contact with the insulated cathode rail 121. Each carrier arm 113 is also formed in its under surface with one or more perforations indicated at 122 to engage the upwardly presented studs 123 of the main conveyor chain 90 by which the carrier arms are advanced along their track with the work articles suspended in the solutions of the tanks. Each carrier arm is also provided on its under face with three parallel ribs 124 so located that in passing forwardly the first rib 124 will be presented just above and in the path of the first groove of the rack block 112 of a transfer chain 111 above referred to, the travel of the transfer chain being more rapidly driven but timed with reference to the main conveyor. When the carrier arm is thus engaged by the rack block 112 of the transfer conveyor the arm is rapidly lifted (pivoting upon guide rail 115) to raise the work article from the tank in which it is at the moment being treated, and, when the rack block reaches the top of the guide rail 111 it will be changed from its approximate vertical position to a horizontal position, the block in turning throwing its central groove into engagement with the central rib 124 of the carrier arm. The arm is carried forwardly in this raised position until the rack block 112 reaches the down turn portion of the track 111, at which point the block again shifts from horizontal to an approximately vertical position, disengaging the middle rib and moving into engagement with the rear side rib 124 of the carrier arm. The carrier arm is carried downwardly in this position immersing the work article in the succeeding tank and again engaging the perforations 122 with the pointed studs 123 of the main conveyor chain 90 which continues the advancing movement of the carrier arm. In this form of mechanism the advance movement during the transfer is accelerated, but during the transfer the carrier is entirely disengaged from the main conveyor and is solely under the control of the transfer conveyor.

In the form of machine illustrated in Figures 15, 16, 17 and 18 of the drawings, the combined lifting and accelerated advance of the carrier arms is effected by means of fixed cams mounted in the path of the carrier arms and with which they are thrown into engagement by the main conveyor for producing the desired accelerated transfer movement of the arms.

In this form of the machine, the main conveyor track and the conveyor chain itself are of the same construction embodied in the first form of the machine shown in Figures 1 to 10 of the drawings. At intervals, the bifurcated conveyor links 30 are provided with outwardly presented perforated studs 125 which project into the horizontal slots 126 of the carrier blocks 127. Vertical pivots 128 connect blocks 127 with studs 125. The carrier blocks 127 are provided with rearwardly projecting arms 129 carrying anti-friction rollers 130, which operate upon the horizontal accelerating cam track 131 mounted above the main conveyor track and corresponding in position and purpose with the accelerating cams 83 of the first form of the machine above-described.

132 are boxings each formed with inwardly presented perforated ears 133 which straddle one of the carrier blocks 127 and are pivotally connected thereto by means of a horizontal pivot pin 134. This boxing 132 has a forwardly presented perforated plate 135 to which carrier arm proper 136 is rigidly bolted by means of screw bolts 137, a plate of suitable insulating material 138 being interposed between carrier arm 136 and the plate 135. This carrier arm 136 is formed with the electrical contact shoe 139 and the article supporting hook end 140, as in the two forms of the machine above-described.

Projecting downwardly from the plate 135 of the boxing 132 is an arm 141 carrying an anti-friction roller 142 designed to intermittently engage and travel upon a lifting cam 143 secured to and projecting laterally from the under supporting frame of the main conveyor track. These lifting cams 143 are designed to be placed above the adjacent walls of treatment tanks where work articles are transferred.

It will be observed with reference to this last form of machine that the main conveyor chain advances the carrier arms normally in horizontal position with the work articles suspended in the solutions of the treatment tanks. As each carrier arm approaches a point of transfer from one tank to another, the arm is lifted by the action of a cam 143 and at the same time its advance is accelerated by the action of a cam 131.

In the three forms of machine illustrated and described as embodying the principle of the present invention, it will be observed that the first and second forms embody carrier lifting devices which are movable relatively to the conveyor carrier lifting chain, while in the third form the carrier lifting device is in the form of a fixed cam with which the carrier arm is thrown into engagement by its advancing movement. In both the first and third forms of the machine, the acceleration of the advance movement of the carrier arms is accomplished by fixed cams with which the carrier arms are forced into engagement by the conveyor. The second form of machine differs from both the first and third forms in the employment of an auxiliary transfer chain which actually disengages the carrier arm from the main conveyor while it is lifted and advanced with an accelerated speed and later lowered and moved back into operative engagement with the main conveyor chain. All three forms embody a side arm conveying mechanism having means for accelerating the advance of articles under transfer from tank to tank.

I claim:—

1. In a machine of the character described, the combination with a succession of tanks, a travelling conveyor, and a carrier arm projecting laterally of and having driving connection with said conveyor, said carrier arm supporting and moving articles through said tanks and transferring them from one tank to another, of means for raising and lowering said carrier arm, and means for laterally advancing said carrier arm at an accelerated rate over the speed of said conveyor as said carrier arm is raised.

2. In a machine of the character described, the combination with a succession of tanks, and a travelling conveyor including side arm carriers movable therewith, of means for raising and lowering said side arm carriers for transferring articles from one tank to another, and means for laterally accelerating the advance of said carriers during the transfer of articles from tank to tank.

3. In a machine of the character set forth, the combination with a plurality of treatment tanks, of a travelling side arm work carrier, a conveyor engaging and transporting said carrier, means for raising and lowering said carrier to transfer work articles from one tank to another tank, and means laterally accelerating the advance of said carrier during said transfer of work articles.

4. In a machine of the character set forth, the combination with a plurality of treatment tanks, of a travelling side arm work carrier, a conveyor engaging and transporting said carrier, means for raising and lowering said carrier to transfer work articles from one tank to another tank, and means engaging said carrier to cause it to advance laterally faster than said conveyor during said transfer of work articles.

5. In a machine of the character described, the combination with a succession of tanks, and a travelling conveyor including side arm carriers movable therewith and pivoted thereon for movement in a substantially horizontal plane, of means for simultaneously raising and laterally accelerating the advance movement of said carriers on said pivots when the free ends of the side arm carriers are moving from one tank to the other at a greater speed than the speed of the travelling conveyor.

6. In a machine of the character described, the combination with a succession of tanks, and a travelling conveyor having carriers movable therewith for supporting articles in and moving them through said tanks and transferring them from one tank to another, said carriers comprising arms projecting laterally from said conveyor and having vertical and horizontal pivotal connections with the conveyor, and means for moving said side arm carriers upwardly and downwardly upon their horizontal pivots and forwardly on their vertical pivots.

7. In a machine of the character described, the combination with a succession of tanks, and a travelling conveyor, of carriers movable with said conveyor and comprising arms projecting laterally from said conveyor and having vertical and horizontal pivotal connections with the conveyor, quick raising means for said carrier arms, and means for accelerating the advance of said carrier arms laterally.

8. In a machine of the character described, the combination with a succession of tanks, and a travelling conveyor, of carrier arms projecting transversely of said conveyor and having vertical and horizontal pivotal connections with the conveyor, quick raising means for raising and lowering said side arm carriers upon their horizontal pivots for transferring articles from one tank to another, and means for moving said carrier arms forwardly laterally on their vertical pivots for accelerating the advance of articles during the transfer from tank to tank.

9. In a machine of the character described, the combination with a succession of solution tanks, and a travelling conveyor having carriers movable therewith for supporting articles in and moving them through said tanks and transferring them from one tank to another, said carriers comprising arms projecting transversely of said conveyor and having operative connections with the conveyor, a guide member parallel with said conveyor supporting said carrier arms, means for raising and lowering said carrier arms for transferring articles from one tank to another, and means for accelerating laterally the advance of said carrier arms during the transfer of articles from tank to tank.

10. In a machine of the character described, the combination with a succession of tanks, and a travelling conveyor, of carriers movable with said conveyor and comprising arms projecting laterally from said conveyor and having vertical and horizontal pivotal connections with the conveyor, a transversely movable frame engaging said carrier arms for lifting them, an auxiliary chain engaging and operating said lifting frame, and means for accelerating the advance of said carrier arms.

11. In a machine of the character described, the combination with a succession of tanks, and a travelling conveyor, of the carrier arms projecting laterally from said conveyor and movable up and down with relation thereto, a transversely movable lifting frame in operative relation to the path of said carrier arms, legs projecting from said lifting frame, an endless chain having laterally projecting members adapted to periodically engage said legs for moving said frame forward and backward.

12. In a machine of the character described, the combination with a succession of tanks, a travelling conveyor, and a carrier arm projecting laterally of and having driving connection with said conveyor, said carrier arm being forwardly movable upon said conveyor, of means for raising and lowering said carrier arm, and a cam in the path of said carrier arm for moving it forwardly upon the conveyor for advancing work articles at an accelerated speed over said conveyor as said carrier arm is raised.

13. In a machine of the character described, the combination with a succession of tanks, and a travelling conveyor, of a carrier arm projecting laterally of and having a vertical pivotal connection with said conveyor, a stationary cam in the path of said carrier arm, an arm projecting from said carrier arm in engagement with said cam and accelerated by it, and means for raising and lowering said carrier arm.

14. In a machine of the character described, the combination with a succession of tanks, a travelling conveyor, and a carrier arm projecting laterally of and having driving connection with said conveyor, said arm being pivotally connected to the travelling conveyor, said carrier arm supporting and moving articles through said tanks and transferring them from one tank to another, of a transfer conveying chain adapted to raise and lower said carrier arm and advance it at an accelerated speed over that of said conveyor in a generally lateral direction.

15. In a machine of the character described, the combination with a succession of tanks, and a travelling conveyor, of carrier arms projecting transversely of said conveyor and having vertical and horizontal pivotal connections with the conveyor, members projecting respectively from said vertically and horizontally pivoted parts of said carrier arms, and cams fixed in the path of said carrier arms adapted to engage said members for raising and lowering said arms and accelerating their advance.

16. In an apparatus for electroplating, a carrier having a constant speed, carrier arms pivoted thereon to travel therewith, and means to vary the position of the arms vertically and laterally with respect to the constant speed carrier so that the outer end of the arms at intervals have accelerated speed over that of the carrier when so moving in the combined vertical and horizontal planes, and means to maintain the outer ends of the carrier arms substantially without movement while the inner ends are moving with the carrier means until the interval of time arrives when the outer ends move with accelerated speed.

17. In an apparatus for electroplating, a substantially constantly moving carrier, carrier arms carried thereby so that their inner ends move with the carrier means at a substantially constant speed, and means for holding the outer ends of said arms substantially stationary during one period.

18. In an apparatus for electroplating, a substantially constantly moving carrier, carrier arms carried thereby so that their inner ends move with the carrier means at a substantially constant speed, means for holding the outer ends of said arms substantially stationary during one period, and means for suddenly moving the outer ends of the carrier arms at a greater speed than that of the carrier means.

19. In an apparatus for electroplating, a substantially constantly moving carrier, carrier arms carried thereby so that their inner ends move with the carrier means at a substantially constant speed, means for holding the outer ends of said arms substantially stationary during one period, means for suddenly moving the outer ends of the carrier arms at a greater speed than that of the carrier means, and means for lifting and lowering the outer end of the carrier arm when this movement takes place.

20. In an apparatus for electroplating, a constantly moving carrier chain, arms pivoted thereon for vertical and horizontal movement, stationarily positioned cam mechanism adapted to engage said arms to cause the outer ends thereof to remain substantially stationary during given periods while the inner ends move with the carrier chain, and further means for causing said arms at their outer ends to suddenly move a predetermined distance at an accelerated speed laterally.

21. In an apparatus for electroplating, a constantly moving carrier chain, arms pivoted thereon for vertical and horizontal movement, stationarily positioned cam mechanism adapted to engage said arms to cause the outer ends thereof to remain substantially stationary during given periods while the inner ends move with the carrier chain, and further means for causing said arms at their outer ends to suddenly move a predetermined distance at an accelerated speed laterally, and means to cause the outer ends of said arms to lift at the beginning of the accelerated speed movement and to lower at the end thereof.

WESLEY F. HALL.